United States Patent
Cook et al.

(10) Patent No.: US 9,356,420 B1
(45) Date of Patent: May 31, 2016

(54) SOLID STATE LASER WITH MULTIPLE CORES COUPLED BY FOLD OPTICS

(71) Applicant: Gooch and Housego PLC, Ilminster, Somerset (GB)

(72) Inventors: Trevor James Cook, Cheriton Bishop (GB); Michael Christopher Cox, Totnes (GB); Peter Edward Mackay, Ilminster (GB)

(73) Assignee: Gooch and Housego PLC, Somerset (GB)

( * ) Notice: Subject to any disclaimer, the term of this patent is extended or adjusted under 35 U.S.C. 154(b) by 0 days.

(21) Appl. No.: 14/720,097

(22) Filed: May 22, 2015

(51) Int. Cl.
*H01S 3/11* (2006.01)
*H01S 3/08* (2006.01)
*H01S 3/06* (2006.01)

(52) U.S. Cl.
CPC ............... *H01S 3/11* (2013.01); *H01S 3/0627* (2013.01); *H01S 3/08059* (2013.01)

(58) Field of Classification Search
CPC ...... H01S 3/11; H01S 3/08059; H01S 3/0627
See application file for complete search history.

(56) References Cited

U.S. PATENT DOCUMENTS 3,289,101 A * 11/1966 Masters ............... H01S 3/07 219/121.6
2002/0122455 A1  9/2002 Knights et al.

FOREIGN PATENT DOCUMENTS

CN 85100857 A 10/1985
CN 201153189 Y 11/2008

* cited by examiner

*Primary Examiner* — Dung Nguyen
(74) *Attorney, Agent, or Firm* — Jetter & Associates, P.A.

(57) ABSTRACT

A laser rod assembly includes a first and second laser rod embedded in a cladding material. The assembly has a first end and a second end. The laser rods generate laser light at $\lambda_{laser}$ ($\lambda_{laser}$ light) when pumped by pump power at $\lambda_{pump}$. A reflecting outer surface at $\lambda_{pump}$ is on or over a majority of an outer surface of the cladding material. Fold optic(s) on the second end provides optical coupling between the laser rods. An optical resonator includes a highly reflecting (HR) mirror at $\lambda_{laser}$ over an end of the first laser rod on the first end and an output coupler over an end of the second laser rod also on the first end.

20 Claims, 4 Drawing Sheets

SOLID STATE LASER WITH MULTIPLE CORES COUPLED BY FOLD OPTICS

FIELD

Disclosed embodiments relate to solid state lasers including laser diode pumped solid state lasers including laser amplifiers and transmitters.

BACKGROUND

A solid-state laser is a laser that has a solid state gain medium. Semiconductor-based lasers (known as laser diodes, diode lasers, or injection lasers) are also all solid state devices, but are generally considered a separate class of lasers from solid-state lasers. Laser diodes comprise a semiconductor junction device which produces coherent radiation in the visible or infrared (IR) spectrum when forward biased so that current passes through it.

Generally, the active medium of a solid-state laser comprises a transparent crystalline or amorphous (glass) "host" material to which is added one or more "dopants", typically a rare earth (RE) element such as neodymium, chromium, erbium, or ytterbium. Most of the common dopants are RE elements, and their operational thresholds can be reached at relatively low intensities of laser pumping. Commonly used solid-state media in which laser action is achieved include neodymium-doped yttrium aluminum garnet (Nd:YAG), neodymium-doped glass (Nd:glass), and ytterbium-doped glasses or ceramics.

Optical lasers and amplifiers having solid state gain media are conventionally optically pumped, using either a flashlamp or by laser diodes. Laser diode-pumped solid-state lasers tend to be significantly more efficient, and have become common as the cost of high power laser diode has decreased. In optical lasers and amplifiers, the RE elements in the laser rod (or core) of the laser or amplifier absorbs pump radiation of a predetermined wavelength provided by the laser diodes and, responsive thereto, provides or amplifies light of a different wavelength for propagation within the rod. For example, a typical ytterbium erbium doped glass (YbEr:glass) eye-safe laser resonator receives pump radiation having a wavelength of 940 nanometers (nm) and amplifies an optical signal having a wavelength in the 1535 nm region which propagates in the laser rod.

Figure 1A:
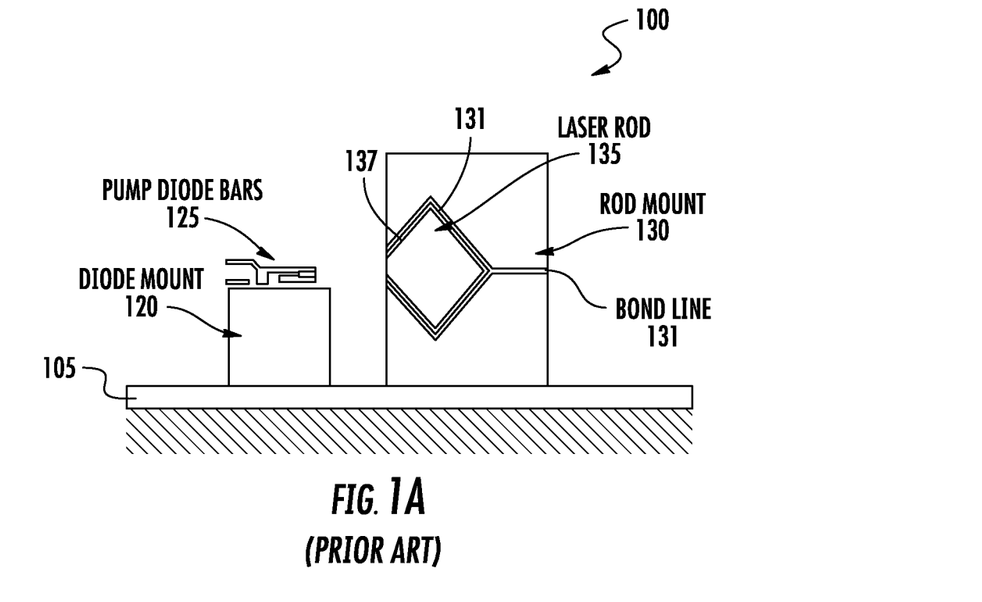
Figure 1B:
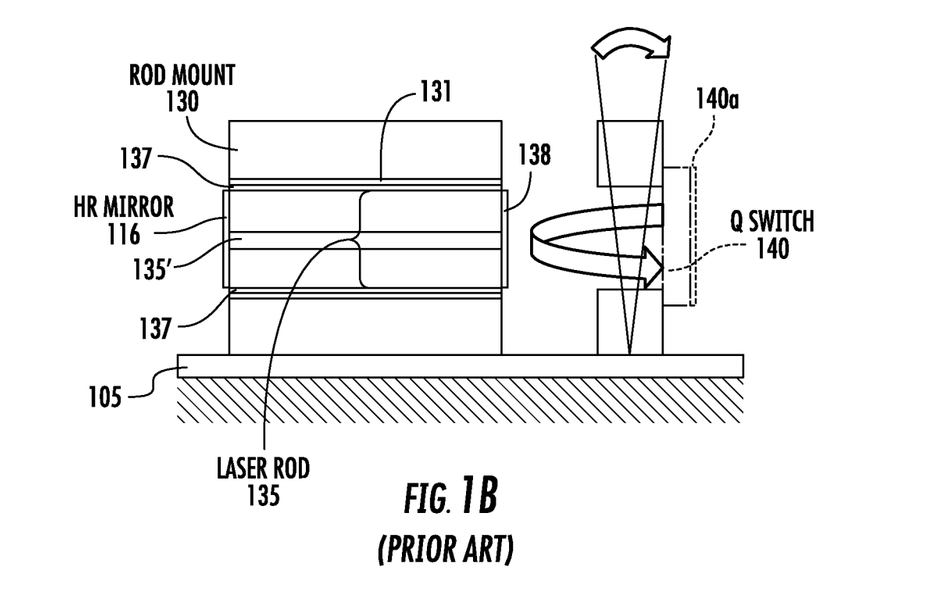

FIGS. 1A and 1B show two views (an end view along the solid doped laser rod (laser rod) 135 and a side view of the same, respectively) of a simplified example of a current state of the art side-pumped laser system 100 including a diode mount 120 having a plurality (e.g., 2) of pump diode bars 125 and a laser rod mount (rod mount) 130 holding the laser rod 135 embedded therein. A bond line 131 is shown between the upper and lower portions of the rod mount 130. The laser rod 135 can be 1.5 mm×1.5 mm with a corner polished flat along its length (polished pump input facet) to form a narrow window through which it is side pumped by the pump diode bars 125. A known advantage of side-pumping is that it allows the use of pump light sources with very low spatial coherence, such as high-power pump diode bars.

Device mounts as known in the art are used to secure generally cylindrical-shaped optical devices such as laser diode modules, fiber collimators and laser rod assemblies to a substrate such as an optical post, breadboard or table. The diode mount 120 and rod mount 130 are spaced apart from one another and are both separately adhesively mounted to a mounting substrate 105.

FIG. 1B shows the side view of the rod mount 130 holding a laser rod 135 embedded therein, where the laser rod 135 is reflectively coated with a reflecting outer surface at the lasing wavelength (reflecting outer surface 137, e.g., gold) except for the polished pump input facet 135', and a composite output coupler coating (output coupler coating) 140a is on a passive Q-switch (Q-switch) 140 comprising flat optic Q-switch having doping so that the initial transmission of the path length therethrough is controlled by the doping level (e.g., cobalt doping in a spinel material), that is spaced apart from the rod mount 130 which is adhesively mounted on the mounting substrate 105. A highly reflecting (HR) mirror 116 providing essentially 100% reflectance at the lasing wavelength is on one end of the laser rod 135, and an anti-reflective (AR) coating 138 is on the other end. The HR mirror 116 and output coupler coating 140a shown on the Q-switch 140 define the optical resonator for laser system 100.

In operation of laser system 100 pump light from the pump diode bars 125 is injected through the polished pump input facet 135' of the laser rod 135 in an otherwise coated reflecting outer surface 137. The arrows shown in FIG. 1B depict how conventional manual optical alignment is implemented by adjusting the position of the output coupler coating 140a on passive Q-switch 140 both rotationally and for tilt while its adhesive to the mounting substrate 105 is uncured or not fully cured in order to effect proper resonator alignment, such as to within 10 arc secs.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize known diode bar pumped laser systems such as the laser system 100 shown in FIGS. 1A and 1B have numerous performance problems and limitations that disclosed laser rod assemblies and laser systems therefrom overcome. The fundamental transverse mode of laser system 100 only supports a small diameter region (i.e. approx. <1 mm) which means that the diode pump beams whilst entering the pump input facet pumping the fundamental region of the laser rod also pumps the rest of the laser rod section resulting in the remainder of the pump light being "wasted" as heat and thus causing inefficiency. Also the output coupler coating 140a on Q-switch 140 is situated separately from the laser rod 135, and being bonded to the base/mounting substrate 105 introduces instability and thus potential for misalignment from either mechanical or thermally induced stresses. Furthermore, the assembly process for laser system 100 is critical to success in that each laser system needs to be manually adjusted into alignment of the resonator and held in place until cured so that in practice there is always some movement resulting in some misalignment once the tooling is released.

Disclosed embodiments include multiple core clad laser rod assemblies that comprise two or more solid-state laser rods (laser rods) embedded in a cladding material that is generally an undoped version of the same material as the laser rods. The cladding material for disclosed embodiments is not required to have a lower refractive index compared to the laser rods as would be the case in a waveguide arrangement, as the cladding material generally only provides mechanical support to the two thin laser rods, acts as a reflecting cavity for the pump wavelength, and conducts heat away from the laser rods. The laser rods or the laser rod mount can have polished ends optically coupled by fold optic(s) on one end that provide a relatively high gain length with a relative short pump length to enable sufficient coupling efficiency to allow pumping by a single pump diode bar. In related laser system embodiments the pump diode bar is bonded to the laser rod assembly, such as to the lower rod mount to implement a side-pumped laser system arrangement.

Disclosed laser rod assemblies allow the output coupler coating and highly reflecting (HR) mirror to be located on the same polished surface so that the output coupler and HR mirror will always be well aligned as they are inherently aligned. The fold optic(s) is situated at the other end of the laser rod assembly which can be adhesiveless bonded (e.g., without an adhesive/glue, such as optical contact bonded) to the laser rod assembly (polished laser rods ends of a polished laser mount) so that the alignment required for the laser system 100 as described above is not needed and as a result conventional alignment problems are eliminated.

To reduce the component count and simplify the laser system assembly whilst increasing stability the fold optic(s) can be fabricated from a passive Q-switch material so that the passive Q-switch material functions as a saturable absorber for Q-switching and as a fold optic. It has been found to be relatively easy to polish the two ends of the clad laser rod (or a laser mount) parallel using conventional optical processing techniques. Because of the high intensity within the operating laser rod it is generally not possible to use optical adhesive to bond the fold optic(s) to couple the generally two laser rods as it would generally burn. However, it is recognized an adhesiveless bonding technique allows the fold optic(s) to be contacted to the laser rod without this disadvantage.

Use of a single pump diode bar enabled by disclosed laser rod assemblies is recognized to provide a significant reduction in cost and size. However, if output energy is the main laser system consideration, multiple diode pump bars can be employed to pump a longer resonator containing a pair of relatively long laser rods.

BRIEF DESCRIPTION OF THE DRAWINGS

Reference will now be made to the accompanying drawings, which are not necessarily drawn to scale, wherein:

FIG. 1A is end view looking along the laser rod and FIG. 1B a side view of the same showing a simplified example of a current state of the art side-pumped laser system including a diode mount having a plurality of pump diode bars and a laser rod mount holding a laser rod assembly including a solid-state laser rod bonded into a mount, while FIG. 1B shows the rod mount holding the solid-state laser rod along with an output coupler coating on a passive Q-switch spaced apart from the rod mount.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 2A:
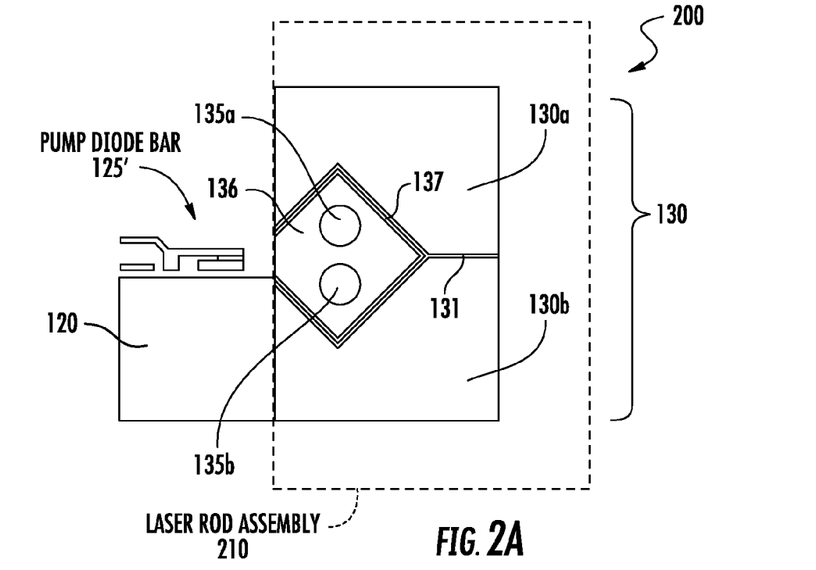
FIG. 2A depicts an example laser system comprising a side-pumped dual-core clad laser rod assembly shown bonded to a diode mount with a single pump diode bar for absorbing optical pump power from the single diode bar and in response generating laser light at a lasing wavelength λlaser, according to an example embodiment.

FIG. 2A depicts an example laser system 200 including a side-pumped dual-laser rod clad assembly (laser rod assembly) 210 shown bonded to a diode mount 120 with a single pump diode bar 125', for absorbing optical pump power from the single pump diode bar 125' and in response generating laser light at a lasing wavelength λlaser, according to example embodiment. The laser rod assembly 210 is shown including a first laser rod 135a and a second laser rod 135b which are doped with one or more lasing atom or ionic species, and the laser rods are embedded in cladding material 136 within a rod mount 130 including an upper rod mount 130a and a lower rod mount 130b. The rod mounts 130a and 130b can comprise a metal or metal alloy material to provide good thermal conductivity that has a coefficient of thermal expansion (CTE) matched to the material of the laser rods 135a, 135b which as described below may comprise a doped glass. A bond line 131 is shown between the upper rod mount 130a and a lower rod mount 130b. As described above, the cladding material 136 need not have a lower refractive index than the laser rods 135a, 135b, and is typically essentially the same refractive index as it is the same material as that of the laser rods albeit undoped as the arrangement is not a waveguide system. The cladding material 136 provides support for the generally thin laser rods 135a, 135b, extracts heat away from them, acts as a reflecting cavity for the pump light, and is generally an integral part of the drawing process from the pre-form.

The first laser rod 135a and second laser rod 135b are shown as non-concentric cores. The first laser rod 135a and second laser rod 135b each have first and second polished ends and each include a transparent host material that can be crystalline or amorphous (e.g., a glass), doped with a same one or more common lasing species (active lasing atoms or ions). The cladding material 136 can be an undoped phosphate glass version of the first laser rod 135a and second laser rod 135b doped phosphate glass material. The laser rod assembly 210 having the dual laser rods 135a, 135b arrangement shown maintains the gain length with a shortened pump length that allows use of only a single pump diode bar 125'.

The laser rod assembly 210 as shown when combined with a fold optic(s) (e.g., fold prism or a mirror arrangement) and Q-switch can provide a passively Q-switched laser transmitter for high performance with low-cost volume production enabled by a single pump diode bar 125'. As described below, the fold prism and Q-switch can be embodied as a single fold prism/Q-switch combination where the fold prism is made from the Q-switch material thus combining the fold prism and Q-switch into a single combined functioning optical component.

The single pump diode bar 125' on a diode mount 120 is shown bonded to the lower rod mount 130b of the laser rod assembly 210 so that the pump light is injected from the side, i.e. in a direction which is roughly perpendicular to that of the laser rods 135a, 135b/laser beam. The single pump diode bar 125' provides pump light as an uncollimated beam and is positioned at a distance typically 0.2 mm (depending upon the full angle divergence of the pump diode in the fast axis) from the pump input facet of the rod cladding pump facet. The clad dual-laser rod comprising the first laser rod 135a and second laser rod 135b embedded in cladding 136 that is reflectively coated with a reflecting outer surface 137 has the advantage of retaining the pump light therein until it has been absorbed by one of the two laser rods (first laser rod 135a and second laser rod 135b) including after multiple internal reflections off reflecting outer surface 137. The reflecting outer surface 137 can be directly on the cladding material 136 or directly on the inner surface of the rod mount in the case of a transparent bonding material being used. As described below, all components of the laser rod assembly 210 including the fold optic(s) and Q-switch can be assembled without any adjustment necessary and critical alignment and stability over the environmental range is intrinsic to the design.

The reflecting outer surface 137 provides a rod clamp area that is on or over a majority of an outer surface of the cladding material 136 around the first laser rod 135a and second laser rod 135b for reflecting pump power that enters through a slit in the reflecting outer surface 137 that allows the pump light to reach the sides of the laser rod(s). The material for the reflecting outer surface 137 can comprise a metal coating such as a gold coating or a transparent adhesive allowing the rod mount 130 to be gold (or other metal) coated to form the cavity reflector as it may be simpler to gold (or other metal) coat the rod mount 130 rather than the clad laser rods. The single pump diode bar 125' is chosen so that its particular emission spectrum is compatible with the absorption band of the first laser rod 135a and second laser rod 135b such that pump light will provoke a laser emission in first laser rod 135a and second laser rod 135b.

Regarding example processing and assembly aspects for providing laser rod assembly 210, preforms of the first laser rod 135a and second laser rod 135b in the cladding material 136 can be drawn on a pulling tower down to the final desired size, such as 2 mm square for the laser rods in one particular embodiment. The size and shape of laser rods after pulling will generally be accurate. The laser rods as well as the upper rod mount 130a and lower rod mount 130b can be manufactured accurately so that a proper glue line shown as bond line 131 is provided, such as using a thermal semi-flexible (e.g., around 70 Shore hardness low outgassing) adhesive with an appropriate filler, which can generally accurately maintain a glue line thickness of about 0.2 mm to provide good thermal transfer yet allows some flexibility to reduce stress. The adhesive can generally be dispensed accurately into the top and bottom v-shaped regions in the upper rod mount 130a and lower rod mount 130b shown. The laser rods 135a, 135b can be positioned and the top pressed slowly onto the rods. The bond line 131 can be formed all around the laser rods 135a, 135b and between the two halves, upper rod mount 130a and lower rod mount 130b of the mount. Once the adhesive for the bond line 131 has cured the laser rod assembly 210 can be removed from the press tool.

Figure 2B:
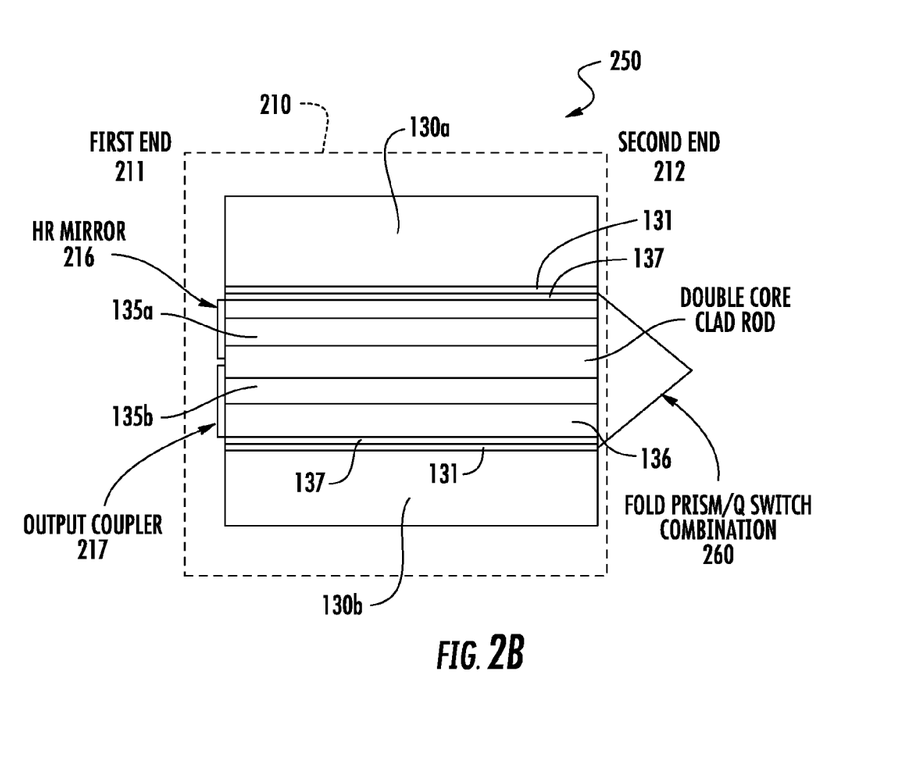
FIG. 2B depicts an example laser rod assembly combination including a side view of the laser rod assembly shown in FIG. 2A identifying a first end having an output coupler coating over one of the laser rod and a HR mirror over the other laser rod, and a second end having fold optic(s) for providing optical coupling combined with a passive Q-switch for providing Q-switching action adhesivelessly bonded to the polished faces of the first laser rod and second lase rod on the second end for reflecting λlaser light between the second end of the first laser rod and the second end of the second laser rod.

FIG. 2B depicts a side view of the laser rod assembly 210 shown in FIG. 2A shown as a laser rod assembly combination 250 identifying a first end of the assembly (first end) 211 having an output coupler coating (output coupler) 217 over laser rod 135b and a HR mirror 216 over laser rod 135a and a second end of the assembly (second end) 212 having a fold optic(s)/Q-switch combination 260 shown in FIG. 2B as a fold prism/Q switch combination bonded thereon for providing optical coupling and a passive Q-switching, according to an example embodiment. In this embodiment the ends of the laser rods 135a and 135b are both polished ends that extend to the first end 211 and to the second end 212. The fold optic(s)/Q-switch combination 260 can comprise a prism made from a passive Q-switch material (such as but not limited to cobalt doped spinel), that is adhesiveless bound using an optical contact bonding process to the polished faces of the first laser rod 135a and second laser rod 135b on the second end 212. The fold optic(s)/Q-switch combination 260 functions as a combined fold prism/Q-switch that when transmissive uses total internal reflections of prisms to fold the intracavity beam to couple laser light between the first laser rod 135a and second laser rod 135b.

Optical contact bonding is a known glueless process whereby two closely conformal surfaces are joined together, being held purely by intermolecular forces. In addition to both surfaces' to be bound together being practically conformal (in practice often completely flat), the surfaces must generally also be essentially clean and free from any small contamination that can prevent or weaken the bond, including grease films and specks of dust. For optical contact bonding to occur, the surfaces need only to be brought together; the intermolecular forces draw the bodies into the lowest energy conformation, and no pressure generally needs to be applied.

Thus the folded resonator formed comprises a HR mirror 216 at λlaser and output coupler 217 co-located on the same polished face being on the first end 211 with the Q-switch fold optic(s) which can be provided by fold optic(s)/Q-switch combination 260 bonded on the second end 212 to compete the optical path. This embodiment generally forms an ultrastable resonator with minimal component count and minimal assembly time.

As noted above, the fold optic(s)/Q-switch combination 260 can be in the form of a prism in one particular embodiment fabricated from cobalt doped spinel whose doping level is prescribed to achieve a typically somewhere between (but not limited to) 70% to 90% initial transmission to perform both the laser beam folding and the Q-switching action needed to produce high peak power short duration pulses. In another embodiment a plate Q-switch sandwich is placed between a transparent glass fold prism if it is desirable to separate the respective folding and Q-switch functions (see FIGS. 3B and 3C described below).

Figure 2C:
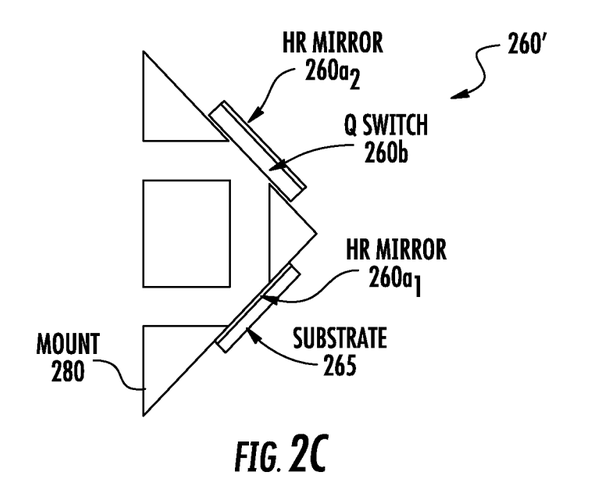
FIG. 2C is a sectional side view of an example mirror-style Q-switch/fold optic combination, according to an example embodiment

However, the fold optic(s) is not limited to prism-based realizations. For example, FIG. 2C is a sectional side view of an example mirror-style Q-switch/fold optic combination 260', according to an example embodiment. This embodiment removes the need for an optical contacting process for adding the Q-switch/fold optic combination. Q-switch/fold optic combination 260' comprises a Q-switch/fold optic mount (mount) 280 that has three holes (e.g., drilled) to provide the air filled light paths shown. Mount 280 can comprise a metal or metal alloy, or glass. On one wall of the mount 280 has a HR mirror coating 260a1 on the inner surface and a substrate 265 (e.g., a glass substrate) shown on the HR mirror coating 260a1. On another wall of the mount 280 there is a passive Q-switch 260b comprising Q-switch material with another HR mirror coating 260a2 on the material of the Q-switch 260b. The passive Q-switch material can provide a 70% to 90% initial transmission for the light path.

The optical resonator provides feedback of light at λlaser for supporting lasing, including a HR mirror 216 at λlaser on the polished face on the first end 211 of the first laser rod 135a, and an output coupler 217 at λlaser on the polished face on the first end 211 of the second laser rod 135b providing an output coupler for emitting λlaser light as an output beam. In one particular embodiment the first laser rod 135a and second laser rod 135b comprise $Yb^{3+}Er^{3+}$-codoped $LaLiP_4O_{12}$ (phosphate) glass to provide an eye-safe laser operating at about 1540 nm, and the cladding material 136 also comprise phosphate glass. Other example rod materials include Nd:YAG or Nd:Glass laser rods with a $Cr^{4+}$YAG Q-Switch prism to enable operation at 1060 nm to 1064 nm, or telluride doped phosphate glass for operation in the mid infrared (mid IR).

Disclosed laser rod assemblies and laser systems therefrom address challenges with conventional side-pumping solid-state lasers due to gain at the edges of the laser modes which can cause poor extraction efficiency and encourage the oscillation of higher-order resonator modes, leading to difficulty to achieve a high gain, good beam quality and high power efficiency as compared with end pumping. In disclosed embodiments the transverse mode does not extend beyond the gain media in the laser rods, whereas in known designs the doped region is the whole rod volume so that lasing can occur outside of the fundamental mode. Thermal heating in the pumped volume is recognized to establish a weak thermal lens that makes this arrangement a stable resonator with well-defined fundamental mode. Regarding alignment stability, it is generally important in a laser resonator that the end mirrors are aligned and maintain alignment throughout the environmental conditions expected during the laser system's operational life. Disclosed laser rod assemblies and laser systems eliminate conventional alignment problems by having both end mirrors (HR mirror 216 and output coupler 217) coated onto one polished plane (first end 211 shown in FIG. 2B) so they start out and always remain perfectly aligned during the laser system's operational life.

Regarding the conventional problems of pump inefficiency and mode restriction, the current state of the art approach described above related to laser system 100 employs a bulk laser rod approach which is larger in size than the fundamental transverse mode. This is because the fundamental mode is only about 0.8 mm in diameter so to fabricate a ~20 mm long laser rod and mount it without bending whilst maximizing heat extraction is very difficult. The doping concentration of the conventional bulk laser rod material is controlled to provide a short absorption depth applicable to side pumping. Accordingly, whilst a significant portion of the pump beam is absorbed in the fundamental region of high gain near the pump input facet, for conventional designs a significant amount of pump light is absorbed in the rest of the laser rod. In the event of misalignment of the two end reflectors the regions adjacent to the fundamental may start to lase thus producing an unacceptable beam profile and poor beam divergence.

Disclosed embodiments reduce the doped region to close to the fundamental diameter and the cladding can be undoped so it extracts heat, acts as a reflecting cavity for the pump light and supports the thin sectioned active laser rods. The fact that the stability is significantly increased and the pumped regions are limited to the fundamental mode means that the beam profile will be maintained throughout the environmental range. There is essentially no gain outside the fundamental transverse mode so it cannot hop to other transverse modes.

Figure 3A:
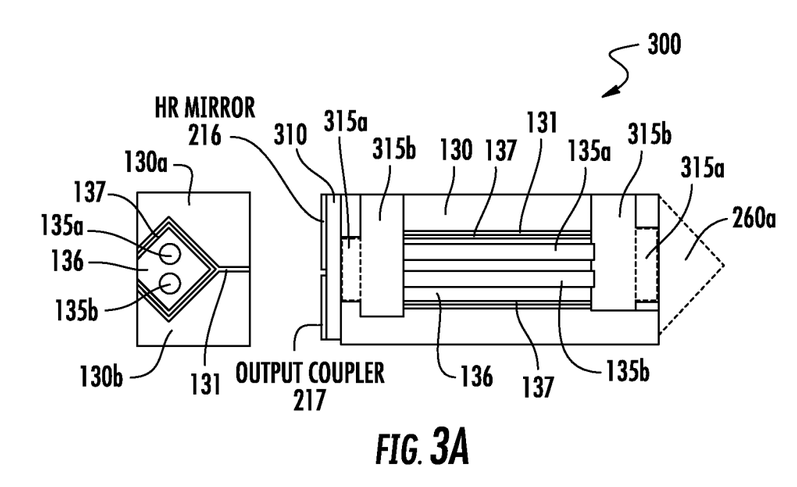
FIG. 3A depicts an example double-pass composite mechanical laser rod assembly where the output coupler and fold optic(s) are mounted to the polished rod mount, according to an example embodiment.

FIG. 3A depicts a double-pass composite mechanical embodiment shown as a laser rod assembly 300, where the output coupler 217 and fold optic(s) 260a are mounted to a laser rod mount having polished ends (rod mount 130 shown as upper rod mount 130a and a lower rod mount 130b), according to example embodiments. In this embodiment the laser rods 135a and 135b are generally AR coated at each end. The mechanical mount is polished flat and parallel at each end and the HR mirror 216 and output coupler 217 is bonded to one end (first end 211 on the left side) of the rod mount 130 while the fold optic(s) 260a is bonded (e.g., using an adhesive) to a polished face of the rod mount 130 on the other end (second end 212 on the right side).

Double-pass laser amplifiers are known to have advantages of compactness and efficiency in the amplification of optical signals over single-pass arrangements. The principle is the same as described above, in this case however the laser rod assembly design 300 is realized in a mechanical way, where the rod mount is made from a low coefficient of thermal expansion (CTE) metal (or other CTE matching mount material) that is CTE matched to the host material of the first laser rod 135a and second laser rod 135b, and that of cladding material 136, which are all typically glass, and polished parallel at each end using optical processing techniques. As a result, a plate with the output coupler 217 and HR mirror 216 on the same plane is bonded to one end of the rod mount 130, and the fold optic(s) 260 (e.g., prism) shown as fold optic(s)/Q-switch combination 260 is bonded to the other end of the rod mount 130.

The laser mount shown in FIG. 3A comprises two parts. A bottom mount portion which has the square feature for the composite clad rod to sit in, and two ends which have through holes to allow a light path. The output coupler 217 and HR mirror 216 are mounted over a glass (or other transparent) plate 310 on one end of the laser rod assembly 300 and the fold optic(s) 260a on the other side. The glass plate 310 is over air gaps 315a and 315b which are on both sides of the laser rod assembly beyond the ends of the laser rods 135a, 135b. A top mount portion (or cover) bonds on to the top half of the composite clad rod.

Also, the reflecting outer surface 137 can be on the inner surface of the rod mount 130 (the sides closest to the laser rods). The advantages laser rod assembly 300 are the same as described above, but this embodiment allows for the resonator length can be defined easily by changing the length of the rod mount 130 so there is no need to increase the length of the laser rods 135a, 135b. This resonator length lengthening feature can be an important consideration if for example the pulse width needs to be increased or the beam divergence decreased.

Figure 3B:
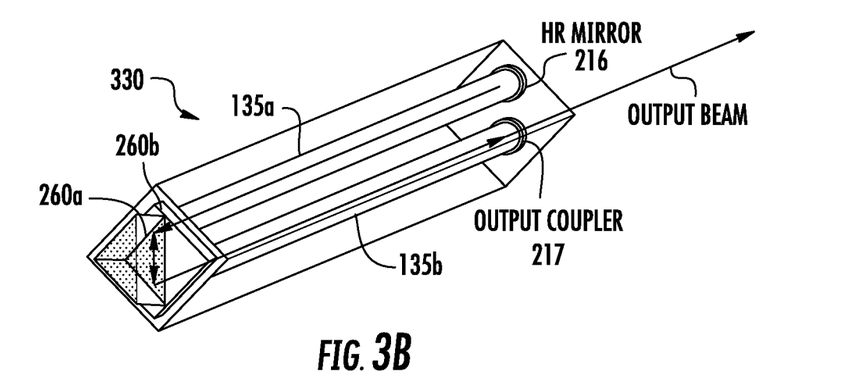
FIGS. 3B and 3C depict example composite laser rod assemblies having a passive Q-switch in an adhesiveless bond sandwich arrangement between a fold prism and the laser rods, and in an adhesiveless bond sandwich between the laser rods and HR mirror/output coupler, respectively, according to example embodiments.
Figure 3C:
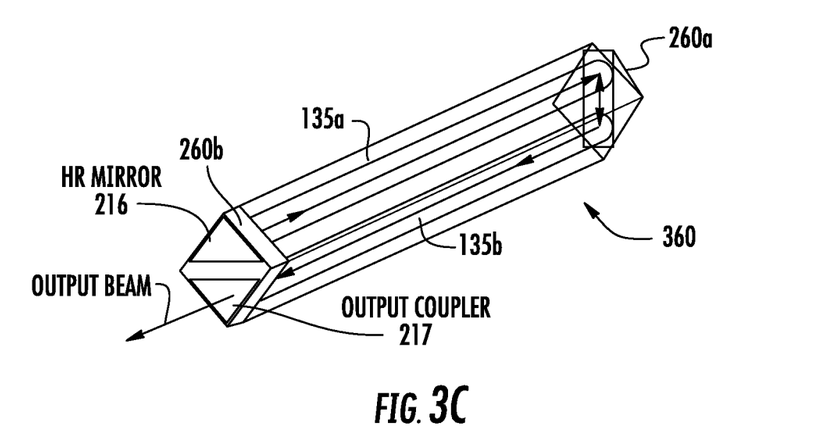

FIGS. 3B and 3C depict composite laser rod assemblies 330 and 360, respectively that can be used with double-pass arrangements. Laser rod assembly 330 has a Q-switch 260b in an adhesiveless bond sandwich arrangement between the fold optic(s) 260a shown as a prism and laser rods 135a and 135b. This embodiment may be useful if necessary for practical reasons the Q-switch and output coupler 217 need to be mounted in a sandwich at one end of the double-core clad laser rod. The laser rod assembly 360 shown in FIG. 3C has a passive Q-switch 260b in an adhesiveless bond sandwich arrangement between the laser rods 135a and 135b and the HR mirror 216 and output coupler 217 shown as a split coating on a plate on one end, with the fold optic(s) 260a on the other end of the laser rod assembly opposite the passive Q-switch 260b. The fold optic(s) 260a optically links laser rods 135a and 135b.

Disclosed laser systems fill the need for a small, compact, efficient, eye-safe laser for a variety of applications. These include law enforcement, rifle, commercial mariners, sports, the construction industry, search and rescue, fire-fighting, skiers, yachting, golf, and municipal agencies. Particular embodiments include an Original Equipment Manufacturer (OEM) micro eyesafe laser transmitter for use in higher level systems, such as an eyesafe laser rangefinder common module assembly set.

EXAMPLES

Disclosed embodiments are further illustrated by the following specific Examples, which should not be construed as limiting the scope or content of this Disclosure in any way.

A preform of undoped phosphate glass with the polished external geometry of the required final laser rod was manufactured with two through-holes parallel and polished down the length of the pre-form. Two doped laser rods were polished to closely fit into the holes in the pre-forms. The preforms were then drawn on a pulling tower down to the final size of about 2 mm square. The resultant long drawn stick was diced into 10 mm long double core clad rods. For the exit surface a split coating was used where the HR mirror 216 was a 100% reflector @ 1535 nm, and the output coupler 217 was a partial reflector typically providing 70% to 90% reflectance at 1535 nm.

The fold optic(s) 260 comprised a fold prism of specially doped passive Q-switch material, with a single path length doped to produce the needed initial transmission at the lasing wavelength of 1535 nm to achieve both the fold in the optical resonator and a passive Q-switch function. For 1535 nm operation the Q-switch material selected was cobalt doped phosphate glass, and an adhesiveless contact bonding process was used to bond the fold optic(s) 260a to the laser rod assembly. Because of this bonding no alignment was required and a high damage thresholds was achieved. All resonator materials in this embodiment have essentially the same thermal and mechanical properties including the undoped cladding material 136 which comprised the same phosphate glass as the laser rods 135a and 135b.

Those skilled in the art to which this disclosure relates will appreciate that many other embodiments and variations of embodiments are possible within the scope of the claims, and further additions, deletions, substitutions and modifications may be made to the described embodiments without departing from the scope of this disclosure.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A laser rod assembly, comprising:
   a first laser rod and a second laser rod embedded in a cladding material, said assembly having a first end and a second end, said first laser rod and said second laser rod each including a host material both doped with a lasing specie(s) for generating laser light at $\lambda$laser ($\lambda$laser light) when pumped by optical pump power at $\lambda$pump;
   a reflecting outer surface at said $\lambda$pump on or over a majority of an outer surface of said cladding material above and below said first and second laser rods;
   fold optic(s) on said second end for providing optical coupling between said first laser rod and said second laser rod, and
   an optical resonator for providing feedback of said $\lambda$laser light for supporting lasing comprising a highly reflecting (HR) mirror at said $\lambda$laser over an end of said first laser rod on said first end and an output coupler over an end of said second laser rod on said first end for emitting said $\lambda$laser light as an output beam.

2. The laser rod assembly of claim 1, further comprising a passive Q-switch for providing Q-switching action within said optical resonator.

3. The laser rod assembly of claim 2, wherein on said second end said passive Q-switch is adhesivelessly bonded to a polished end of said first laser rod and to a polished end of said second laser rod.

4. The laser rod assembly of claim 3, wherein said fold optic(s) comprises a fold prism including Q-switch material with a dopant level providing an initial single-pass transmission at said $\lambda$laser for providing both a fold in said optical resonator and said passive Q-switch.

5. The laser rod assembly of claim 2, wherein said fold optic(s) comprises a HR mirror coating, further comprising a Q-switch/fold optic mount that has holes for providing air light paths, where one wall of said Q-switch/fold optic mount has said HR mirror coating on an inner surface and a substrate on said HR mirror coating, and another wall of said Q-switch/fold optic mount has said passive Q-switch with said HR mirror coating thereon.

6. The laser rod assembly of claim 2, wherein said fold optic(s) comprises a fold prism and said passive Q-switch is in a adhesiveless bond sandwich arrangement on said first end between said fold prism and said first and second laser rods or said fold prism is on said second end and said passive Q-switch is in a adhesiveless bond sandwich on said first end between said first and second and laser rods and said HR mirror and said output coupler.

7. The laser rod assembly of claim 2, wherein said fold optic(s) is on said second end, is bonded to a second polished face of a rod mount and comprises a fold prism including Q-switch material with a single path length doped to produce an initial transmission at said $\lambda$laser for providing both a fold in said optical resonator and said passive Q-switch, and wherein said HR mirror and said output coupler are bonded to a transparent plate over a first polished face of said rod mount.

8. The laser rod assembly of claim 1, wherein said host material comprises a glass in said first laser rod and in said second laser rod, and wherein said cladding material is an undoped version of said glass.

9. The laser rod assembly of claim 8, wherein said glass comprises a phosphate glass.

10. A laser rod assembly, comprising:
a first laser rod and a second laser rod embedded in a cladding material,
said assembly having a first end and a second end, said first and second laser rod each including a host material both doped with a lasing specie(s) for generating laser light at λlaser (λlaser light) when pumped by optical pump power at λpump;
a reflecting outer surface at said λpump on or over a majority of an outer surface of said cladding material above and below said first and second laser rods;
fold optic(s) on said second end adhesivelessly bonded to a second polished end of said first laser rod and to a second polished end of said second laser rod for providing optical coupling between said first laser rod and said second laser rod, and
an optical resonator for providing feedback of said λlaser light for supporting lasing comprising a highly reflecting (HR) mirror at said λlaser adhesivelessly bonded to a first polished end of said first laser rod and an output coupler adhesivelessly bonded to a first polished end of second laser rod for emitting said λlaser light as an output beam,
wherein said fold optic(s) comprises a fold prism comprising Q-switch material with a single path length doped to produce an initial transmission at said λlaser for providing both a fold in an optical resonator and a passive Q-switch.

11. A laser diode bar system (laser system), comprising:
a substrate having at least one pump diode bar on a diode mount thereon and a laser rod assembly in a rod mount having an upper and lower rod mount thereon, wherein said diode mount is bounded to said upper or lower rod mount;
said laser rod assembly including:
a first laser rod and a second laser rod embedded in a cladding material,
said assembly having a first end and a second end, said first and second laser rod each including a host material both doped with a lasing specie(s) for generating laser light at λlaser (λlaser light) when pumped by optical pump power at λpump;
a reflecting outer surface at said λpump on or over an outer surface of said cladding material above and below said first and second laser rods;
fold optic(s) on said second end for providing optical coupling between said first laser rod and said second laser rod, and
an optical resonator for providing feedback of said λlaser light for supporting lasing comprising a highly reflecting (HR) mirror at said λlaser over an end of said first laser rod on said first end and a output coupler over an end of said second laser rod on said first end for emitting said λlaser light as an output beam.

12. The laser system of claim 11, further comprising a passive Q-switch for providing Q-switching action within said optical resonator.

13. The laser system of claim 12, wherein on said second end said passive Q-switch is adhesivelessly bonded to a polished end of said first laser rod and to a polished end of said second laser rod.

14. The laser system of claim 13, wherein said fold optic(s) comprises a fold prism comprising Q-switch material with a dopant level providing an initial single-pass transmission at said λlaser for providing both a fold in said optical resonator and said passive Q-switch.

15. The laser system of claim 12, wherein said fold optic(s) comprises a HR mirror coating, further comprising a Q-switch/fold optic mount that has holes for providing air light paths, where one wall of said Q-switch/fold optic mount has said HR mirror coating on an inner surface and a substrate on said HR mirror coating, and on another wall of said Q-switch/fold optic mount has said passive Q-switch with said HR mirror coating thereon.

16. The laser system of claim 12, wherein said fold optic(s) comprises a fold prism and said passive Q-switch is in a adhesiveless bond sandwich arrangement on said first end between said fold prism and said first and second laser rods or said fold prism is on said second end and said passive Q-switch is in a adhesiveless bond sandwich on said first end between said first and second and laser rods and said HR mirror and said output coupler.

17. The laser system of claim 12, wherein said fold optic(s) is on said second end, is bonded to a polished face of said rod mount and comprises a fold prism including Q-switch material with a single path length doped to produce an initial transmission at said λlaser for providing both a fold in said optical resonator and said passive Q-switch, and wherein said HR mirror and said output coupler is bonded to a transparent plate over a first polished face of said rod mount.

18. The laser system of claim 11, wherein said host material comprises a glass in said first laser rod and in said second laser rod, said cladding material is an undoped version of said glass.

19. The laser system of claim 18, wherein said glass comprises a phosphate glass.

20. The laser system of claim 11, wherein said at least one pump diode bar consists of a single said pump diode bar.

* * * * *